Patented May 14, 1935

2,000,964

UNITED STATES PATENT OFFICE 2,000,964

PROCESS OF POLYMERIZING MONO-OLEFINES

Samuel Lenher, Wilmington, Del., assignor to E. I. du Pont de Nemours & Company, Wilmington, Del., a corporation of Delaware No Drawing. Application January 27, 1933, Serial No. 653,831

10 Claims. (Cl. 260—170)

This invention relates to the pyrolysis and polymerization of mono-olefines in the presence of small amounts of oxygen, and it particularly relates to the treatment of the mono-olefine hydrocarbon ($C_nH_{2n}$) having less than 10 carbon atoms.

One object of this invention is a new process for effecting thermal treatment of the mono-olefine hydrocarbons having less than 10 carbon atoms to produce higher analogs and polymers thereof. A further object comprises effecting the pyrolysis of lower mono-olefine hydrocarbons to yield higher mono-olefine hydrocarbons without the formation of excessive amounts of undesirable by-products which greatly reduce the yield of higher olefines in existing processes.

These objects are accomplished by the following invention in which an olefine hydrocarbon, or a mixture of olefine hydrocarbons or olefine-containing gas is heated to an elevated temperature in the presence of relatively small amounts of oxygen.

The process of the present invention may be carried out in the apparatus described in my copending application Serial No. 533,561, filed April 26, 1931. In the apparatus described in this copending application the olefines are pumped thru an inlet tube into a reaction vessel maintained at the proper temperature, the reaction mixture being withdrawn from the reaction vessel, passed in indirect relationship with the incoming gases, and thence to a condenser which may serve as a receiver, the condensed products and the spent gas being withdrawn from the condenser, the spent gas, if desired, being recycled thru the apparatus together with additional olefine-containing material. The reaction tube is heated by external heating means, and further heat may be imparted to the gases by heating the inlet tube.

The process is best carried out at oxygen concentrations which do not exceed 5% of the hydrocarbon concentration, the preferred oxygen concentration being below 1%. It has been found that at temperatures above 400° C. oxygen causes not only an oxidation of olefine hydrocarbons to oxidation products containing chemically-bound oxygen, but causes in addition a decomposition, condensation, and polymerization of the olefine hydrocarbons to form olefine products of higher molecular weight and also corresponding to the formula $C_nH_{2n}$.

My copending application referred to above states that olefine hydrocarbons with 15% or more of oxygen yield valuable oxidation products at elevated temperatures. The present invention is limited to oxygen concentrations below the range covered in the said copending application, for it has been found that only in the presence of relatively small amounts of oxygen, i. e., of 5% or less, with or without a correspondingly small amount of inert diluent gas, such as nitrogen or methane, is the condensation and polymerization of the olefines and their decomposition products effected to any considerable degree in addition to the consumption of oxygen by the olefine. The rate of polymerization and condensation of the olefines is greatly reduced in the gas phase by dilution with appreciable amounts of inert diluent, and it is therefore desirable that diluent gas, if it is present during the reaction, be present in non-excessive amounts.

My experiments have shown that ethylene and propylene are polymerized to higher olefine products in the presence of less than 1% of oxygen at elevated temperatures under conditions under which the oxygen-free gases are unreactive and are not polymerized. For example, under my conditions oxygen-free ethylene was not changed on heating for three seconds in glass or metal vessels at 535° C., and oxygen-free propylene was not changed on heating for 10 seconds at 510° C. Under the same conditions, using ethylene containing 0.5% to 1% of oxygen, all the oxygen was consumed by the ethylene and in addition an amount of ethylene equal to that used up in consuming the oxygen was polymerized to yield the products, propylene and butylene. Again under the same conditions propylene containing 0.5% to 1.0% of oxygen was oxidized to consume all the oxygen and in addition an amount of propylene equal to that used up in consuming the oxygen was transformed to yield the products, butylene, amylene, and hexylene.

At 600° C. with ethylene in the apparatus described in my copending application already referred to, and with oxygen present in an amount slightly less than 0.5% of the ethylene, three times as much ethylene was polymerized as was oxidized. The polymerization products in the order of their abundance were propylene (59.3% of the whole), butylene (12.2%), and amylene (28.4%).

At 600° C. with propylene containing slightly less than 0.5% oxygen two and one-half times as much propylene was polymerized as was oxidized. The polymerization products in the order of their abundance were olefines above $C_6H_{12}$, boiling range 70°–100° C. (30.4%), hexylenes (32.3%), amylenes (27.4%), and butylenes (9.3%).

With an increase in temperature and at a heating period of less than 10 seconds, and preferably of less than 2 seconds, the amount of olefine polymerization in the presence of small amounts of oxygen increases rapidly. At a temperature of about 600° C. the polymerization takes place without separation of carbon or hydrogen or excessive formation of methane and other paraffins. At temperatures above 650° C. decomposition of the olefines and their polymerization products becomes an important reaction with a consequent lowering in the yield of the desired polymerization products.

This polymerization of the olefines in the presence of small amounts of oxygen proceeds rapidly without explosion or inflammation in the free space of an unpacked vessel and it has been found less favorable to the reaction to use narrow tubes or packed vessels for this process. Reaction vessels which offer little resistance to the flow of the gas are therefore preferred.

The temperature at which this process may be carried out may vary from 400° C. to 700° C. but the preferred temperature range is between 550° C. and 650° C. At the lower temperatures the reaction products comprise mainly the next higher members of the olefine series, as with ethylene, propylene is the principal product, and with propylene, butylene is the principal product. For example, with ethylene and with slightly less than 1% of oxygen at 490° C. and a time of heating of three seconds the reaction product contained 91.4% propylene and 8.6% butylene, and at 600° C. the reaction product contained 59.3% propylene, 12.2% butylenes, and 28.4% amylenes. With propylene and with slightly less than 1% of oxygen at 500° C. the reaction product contained 23.4% butylenes, 23.0% amylenes, and 53.6% hexylenes, and at 600° C. the reaction product contained 9.3% butylenes, 27.4% amylenes, 32.3% hexylenes, and 30.4% higher olefines boiling from 70°–100° C. It is evident from these examples that the nature of the pyrolytic products can be controlled by adjusting the temperature conditions.

This process may be operated as a batch process or as a continuous or flow process. It is preferred to carry out the process in a flow system or in a recirculation system in which the reaction products are separated from the reacting gases during each cycle. In the operation of a continuous process oxygen should be fed in with the hydrocarbon gases in order to maintain the oxygen concentration at a constant amount (less than 5%). The products may be separated by absorption, adsorption or by solution or refrigeration or any other of the well known means of separating the olefin hydrocarbons from gaseous mixtures. In a continuous process using a series of reaction chambers or any recirculation system where the gas is passed a succession of times through the same reaction chamber, it is necessary to add oxygen to the gases as it is consumed during the run in order to maintain the formation of the hydrocarbon reaction products.

This process permits of a number of modifications, which will be evident from the above disclosure. It is possible to operate this process at atmospheric pressure, at reduced pressure or at high pressures, but it is preferred in general to operate at atmospheric pressure or under applied pressure.

While the process has been described particularly with respect to ethylene and propylene, it is also applicable to higher olefines such as amylene, hexylenes, octylenes and nonylenes. It is, however, particularly advantageous when used with the lower olefine such as butylene and particularly with ethylene and propylene.

This process is of particular advantage because it enables the valuable higher mono-olefine hydrocarbons to be produced from the lower olefines at lower temperatures and in better yields at these temperatures than has been the practice heretofore.

The above description and examples are intended to be illustrative only. Any modification of or variation therefrom which conforms to the spirit of the invention is intended to be included within the scope of the claims.

I claim:

1. A process of polymerizing mono-olefines to form mono-olefines of a greater molecular weight, which comprises heating a mono-olefine having less than 10 carbon atoms under a temperature of 400°–700° C. while admixed with oxygen of a concentration of between about 0.5% and 5% based on the olefine.

2. The process of claim 1 in which the temperature range is 550° to 650° C.

3. The process of claim 1 in which the oxygen content is between about 0.5% and 1%.

4. The process of claim 1 in which the reaction takes place in free space.

5. The process of claim 1 in which the gaseous mixture is passed thru a heated reaction vessel which offers no substantial resistance to the flow of the gas.

6. The process of claim 1 in which the gaseous mixture is passed thru a heated reaction vessel in which the period of heating per unit of gas is less than 10 seconds.

7. The process of claim 1 in which the gaseous mixture is passed thru a heated reaction vessel in which the period of heating per unit of gas is less than 2 seconds.

8. The process which comprises heating ethylene containing between about 0.5% and 5% oxygen at a temperature of 400°–700° C.

9. The process which comprises heating propylene containing between about 0.5% and 5% oxygen at a temperature of 400°–700° C.

10. In a process for forming compounds of higher molecular weight from compounds of lower molecular weight, the step which consists in heating a gaseous mixture of a mono-olefine having less than 10 carbon atoms and oxygen in the concentration of between about 0.5% and 5% based on the olefine content, under a temperature of 400°–700° C.

SAMUEL LENHER.